United States Patent
Niemoeller et al.

(10) Patent No.: US 10,430,172 B2
(45) Date of Patent: Oct. 1, 2019

(54) RE-CONFIGURATION IN CLOUD COMPUTING ENVIRONMENTS

(75) Inventors: Joerg Niemoeller, Sundbyberg (SE); Calin Curescu, Solna (SE); Dimitri Mazmanov, Solna (SE); Konstantinos Vandikas, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 760 days.

(21) Appl. No.: 14/431,465

(22) PCT Filed: Sep. 3, 2012

(86) PCT No.: PCT/SE2012/050931
§ 371 (c)(1),
(2), (4) Date: Mar. 26, 2015

(87) PCT Pub. No.: WO2014/035309
PCT Pub. Date: Mar. 6, 2014

(65) Prior Publication Data
US 2015/0242200 A1    Aug. 27, 2015

(51) Int. Cl.
*G06F 9/44*       (2018.01)
*G06F 8/65*       (2018.01)
(Continued)

(52) U.S. Cl.
CPC .............. *G06F 8/65* (2013.01); *G06F 9/5077* (2013.01); *H04L 47/783* (2013.01); *H04L 67/10* (2013.01)

(58) Field of Classification Search
CPC .... G06F 9/44505; G06F 9/5011; G06Q 10/06
See application file for complete search history.

(56) References Cited

U.S. PATENT DOCUMENTS

| | | | |
|---|---|---|---|
| 8,412,810 B1* | 4/2013 | Tompkins | G06F 9/45558 709/201 |
| 8,434,080 B2* | 4/2013 | Yendluri | G06F 9/5072 717/177 |

(Continued)

OTHER PUBLICATIONS

Venticinque, et al., "Agents base Cloud Computing Interface for Resource Provisioning and Management", 2012 Sixth International Conference on Complex, Intellegent, and Software Intensive Systems. IEEE Jul. 4, 2012, pp. 249-256, XP032208278.

(Continued)

*Primary Examiner* — Duy Khuong T Nguyen
(74) *Attorney, Agent, or Firm* — Patent Portfolio Builders, PLLC

(57) ABSTRACT

There is provided a data structure for re-configuration of an application hosted in a cloud computing environment. The data structure comprises a software template for use in a software scheme. The software template describes a flow of actions executable by a cloud management unit in the cloud computing environment for re-configuration of an application hosted by the management unit and executable by the management unit using the software scheme. The software template comprises software instructions comprising a first portion of software instructions non-editable by a programming interface unit of the hosted application. The software template allows for a second portion of software instructions to be added to the software template by the programming interface unit of the hosted application. Methods and devices for re-configuration using the data structure are also provided.

18 Claims, 6 Drawing Sheets

(51) Int. Cl.
G06F 9/50 (2006.01)
H04L 12/911 (2013.01)
H04L 29/08 (2006.01)

(56) References Cited

U.S. PATENT DOCUMENTS

| | | | | |
|---|---|---|---|---|
| 8,621,058 B2* | 12/2013 | Eswaran | .............. | G06F 9/5072 |
| | | | | 709/223 |
| 9,274,811 B1* | 3/2016 | Reeves | ..................... | G06F 8/61 |
| 2010/0114618 A1* | 5/2010 | Wilcock | ................. | G06Q 10/06 |
| | | | | 705/7.37 |
| 2011/0078680 A1* | 3/2011 | Lagergren | ............. | G06F 9/5077 |
| | | | | 718/1 |
| 2011/0178831 A1* | 7/2011 | Ravichandran | ........ | G06Q 10/06 |
| | | | | 705/7.11 |
| 2011/0238797 A1* | 9/2011 | Wee | ..................... | G06F 15/177 |
| | | | | 709/220 |
| 2012/0266159 A1* | 10/2012 | Risbood | ............. | G06F 9/44505 |
| | | | | 717/177 |
| 2013/0091285 A1* | 4/2013 | Devarakonda | ........ | G06F 9/4856 |
| | | | | 709/226 |

OTHER PUBLICATIONS

Office Action in EP application No. 12762683.6 dated Jul. 2, 2015.
Office Action in EP application No. 12762683.6 dated Oct. 10, 2017.

* cited by examiner

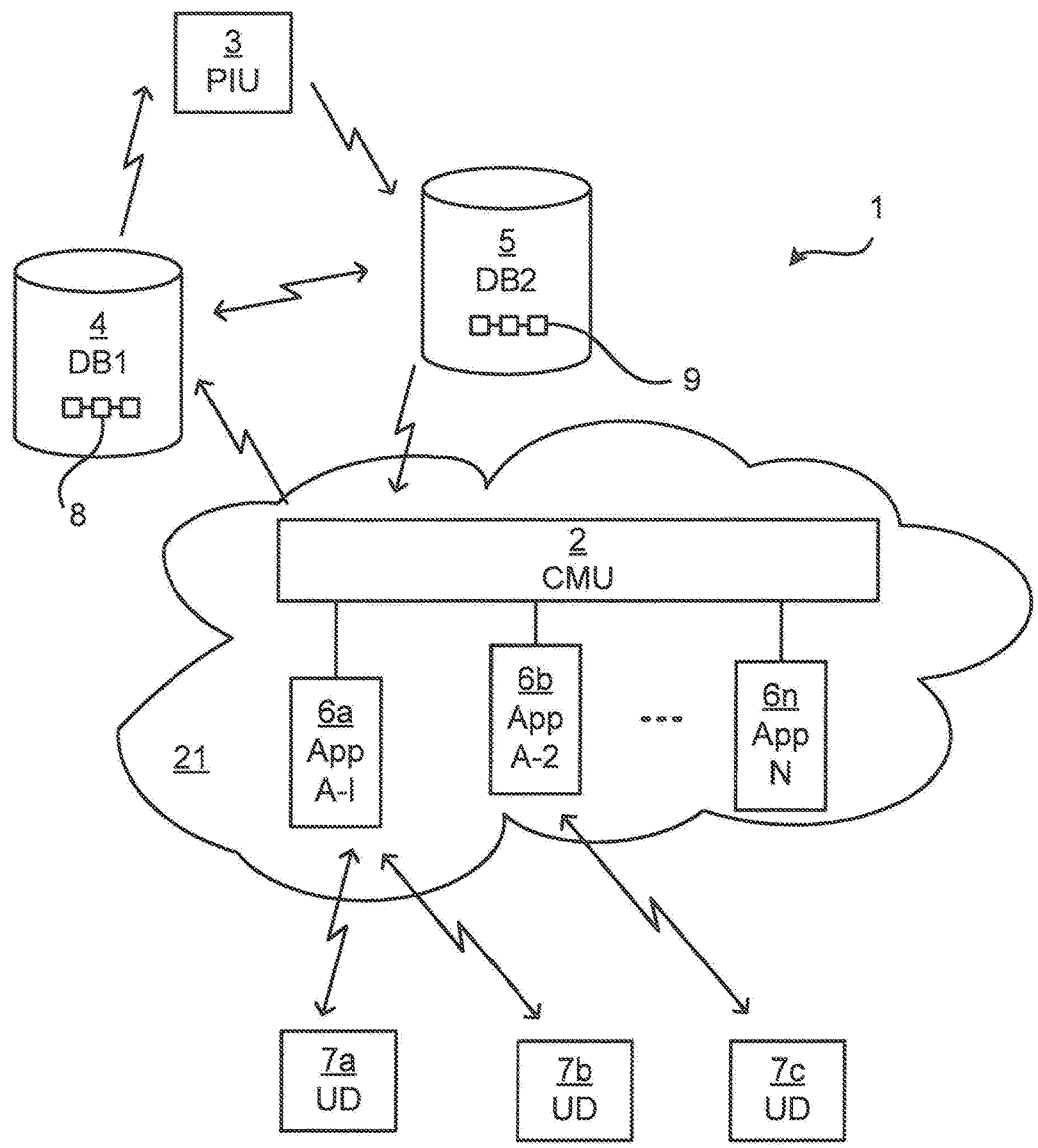
Fig. 1
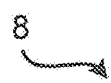
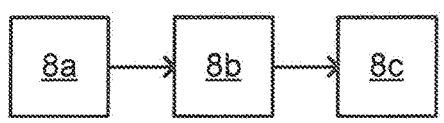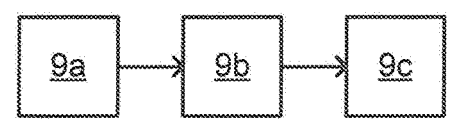
Fig. 2                Fig. 3

RE-CONFIGURATION IN CLOUD COMPUTING ENVIRONMENTS

CROSS REFERENCE TO RELATED APPLICATION(S)

This application is a 35 U.S.C. § 371 National Phase Entry Application from PCT/SE2012/050931, filed Sep. 3, 2012, the disclosure of which is incorporated by reference.

TECHNICAL FIELD

Embodiments presented herein relate to cloud computing environments, and particularly to re-configuration of hosted applications in cloud computing environments.

BACKGROUND

In general terms, cloud computing relates to the use of computing resources (hardware and/or software) that are delivered as a service over a network (typically the Internet).

Examples of services associated with applications hosted and executed by a cloud manager include, but are not limited to, infrastructure as a service (IaaS), platform as a service (PaaS), software as a service (SaaS), storage as a service (STaaS), security as a service (SECaaS), data as a service (DaaS), business process as a service (BPaaS), test environment as a service (TEaaS), desktop as a service (DaaS), and application programming interfaces (API) as a service (API-aaS).

Existing configuration management technologies for automating the deployment and installations of components in cloud computing environments comprise a script or a collection of scripts that can automatically install software or a software stack on virtual machines in the cloud computing environment. However, today the integration between the hosted application, the installed software stack and the cloud manager is quite static and highly integrated. Operations such as scaling may be performed by the cloud manager for simple applications without interaction with the hosted application itself and/or with the software platform providing the hosted applications to the cloud computing environment. Operations such as scaling can be performed if the existing installation of the hosted application in the cloud computing environment can simply be cloned, thus replicated for scaling up or if a clone is deleted for scaling down. In these cases only the load balancer of the cloud manager needs to be re-configured to provide load to all available installations.

But other scaling operations comprising adding more resources or removing resources from an application could be tedious. For example, as soon as states and data are involved, the hosted application or the software platform needs to actively support all changes to the hosted application, which changes are required during the scaling operation. For example, if a user profile database node is to be scaled up by adding further server nodes, the user profile database needs to be split, moving some of the data to the new host, while keeping some data on the existing host. The cloud manager cannot perform the operations involved to enable this split without specific information of this particular database and the data contained therein.

Hence, there is still a need for an improved re-configuration of an application hosted in a cloud computing environment.

SUMMARY

An object of embodiments herein is to provide improved re-configuration of an application hosted in a cloud computing environment.

According to a first aspect there is presented a data structure for use in a cloud computing environment. The data structure comprises a software template for use in a software scheme. The software template describes a flow of actions executable by a cloud management unit in the cloud computing environment for re-configuration of an application hosted by the management unit and executable by the management unit using the software scheme. The software template comprises software instructions comprising a first portion of software instructions non-editable by a programming interface unit of the hosted application. The software template allows for a second portion of software instructions to be added to the software template by the programming interface unit of the hosted application.

Advantageously the portability of complex applications from one cloud computing environment to another one is thereby improved and made less costly because the effort for integration can be saved as long as the cloud management unit supports the software scheme.

Advantageously application development and parts of its integration is enabled to be performed without having access to information relating to exactly which cloud infrastructure is targeted whilst at the same time allowing and enabling the use of complex re-configuration schemes. The disclosed data structure thereby introduces a new degree of encapsulation and separation of concerns.

The re-configuration generally relates to any kinds of re-configuration of an application hosted and executable by the cloud management unit in the cloud computing environment. Specific examples of re-configuration operations include, but are not limited to, scaling and software updates, where each node of the hosted application may be updated in live traffic, where well defined processes with contributions from the cloud management unit and an application's control instance may be needed.

According to a second aspect there is presented a computer program product comprising a data structure according to the first aspect.

According to a third aspect there is presented a computer program product comprising a computer program according to the second aspect and a computer readable means on which the computer program is stored.

According to a fourth aspect there is presented a method for re-configuration of an application hosted and executable by a cloud management unit in a cloud computing environment, the method being performed by the cloud management unit. The method comprises providing a data structure according to the first aspect to a first database.

According to a fifth aspect there is presented a method for re-configuration of an application hosted and executable by a cloud management unit in a cloud computing environment, the method being performed by a programming interface unit. The method comprises retrieving a data structure according to the first aspect from a first database. The method further comprises applying the software template of the data structure to an application by adding the second portion of software instructions, thereby generating a software scheme. The method further comprises transmitting the software scheme to a second database.

According to a sixth aspect there is presented a cloud management unit for re-configuration of an application hosted and executable by the cloud management unit in a cloud computing environment. The cloud management unit comprises a transmitter arranged to provide a data structure according to the first aspect to a first database.

According to a seventh aspect there is presented a programming interface unit for re-configuration of an application hosted and executable by a cloud management unit in a cloud computing environment. The programming interface unit comprises a receiver arranged to retrieve a data structure according to the first aspect from a first database. The programming interface unit further comprises a processing unit arranged to apply the software template of the data structure to an application by adding the second portion of software instructions, thereby generating a software scheme. The programming interface unit further comprises a transmitter arranged to transmit the software scheme to a second database.

The computer program of the second aspect may additionally or alternatively comprise computer program code which, when run on a cloud management unit and/or a programming interface unit, causes the cloud management unit and/or the programming interface unit to perform a method according to the fourth aspect and/or fifth aspect.

It is to be noted that any feature of the first, second, third, fourth, fifth, sixth or seventh aspects may be applied to any other aspect, wherever appropriate. Likewise, any advantage of the first aspect may equally apply to second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 schematically illustrates a communications system where embodiments presented herein may be applied;

FIG. 2 schematically illustrates a software template;

FIG. 3 schematically illustrates a software scheme;

DETAILED DESCRIPTION

Figure 4:
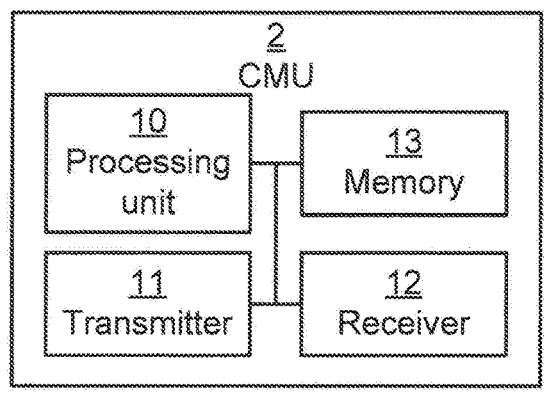
FIG. 4 schematically illustrates functional modules of a cloud management unit.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

As noted above, cloud computing generally relates to the use of computing resources (hardware and/or software) that are delivered as a service over a network (typically the Internet). In brief, cloud computing entrusts remote services with a user's data, software and/or computation. Further, cloud computing relies on sharing of resources to achieve coherence. FIG. 1 is a schematic diagram illustrating a communications system 1 where embodiments presented herein can be applied. In the example communications system 1 of FIG. 1 a cloud management unit (CMU) 2 hosts a number n of applications (App A-1, App A-2, . . . App N) 6a, 6b, . . . , 6n in a cloud computing environment 21. The hosted applications 6a-n have been provided by one or more programming interface units (PIU), one of which is illustrated at reference numeral 3. The hosted applications 6a-n may be a database service, a webserver service, a web service, or a software application. The software application may represent any piece of software running in the cloud environment 21, such as a Java Application Server, a business process execution language engine, a simulation/mathematics software performing calculations, etc. In general terms, the hosted applications 6a-n may thereby provide infrastructure as a service (IaaS), platform as a service (PaaS), software as a service (SaaS), storage as a service (STaaS), security as a service (SECaaS), data as a service (DaaS), business process as a service (BPaaS), test environment as a service (TEaaS), desktop as a service (DaaS), and/or application programming interfaces (API) as a service (APIaaS).

A number of user devices (UD) 7a, 7b, 7c are arranged to interact with the applications 6a-n hosted by the CMU 2. The UD 7a-c may typically be desktop computers, laptop computers, tablet computers and/or so-called smartphones. The communications between the applications 6a-n and the cloud computing environment 21 may occur over a wireless interface (inter alia via a mobile radio communications network) or over a wired interface (such as an optical fibre communications network, or a twisted-pair communications network). In the view of the UDs 7a-7c the applications 6a-n may thus represent remote services. The example communications system 1 of FIG. 1 further comprises a first database (DB1) 4 and a second database (DB2) 5 with which the CMU 2 and each PIU 3 may exchange information. In a typical scenario users would access the cloud computing environment 21 using the client devices 7a-c operatively connected to the cloud computing environment 21. End users of the user devices 7a-c may access the cloud-based applications through a web browser or a light-weight desktop application or a mobile application (a so-called "App") run on the user devices 7a-c while the business software and the end users' data are stored on servers (such as in the databases 4, 5) at a location being remote from the user devices 7a-c.

The embodiments disclosed herein relate to re-configuration of applications 6a-n hosted and executable by the management unit 2 in the cloud computing environment 21. As schematically illustrated in FIG. 1, cloud architecture, i.e., the systems architecture of the software systems involved in the delivery of cloud computing, typically involves multiple cloud components, such as applications 6a-n and the CMU 2, communicating with each other over a loose coupling mechanism, such as a messaging queue.

In order to obtain the re-configuration there is provided a data structure, a computer program product comprising the data structure, a computer-readable medium comprising the computer program product, as well as methods for re-configuration and devices performing the methods. Steps of the methods may be performed by different entities in the communications system 1. Particularly, parts of the methods may be performed by the provided CMU 2 and the PIU 3.

FIG. 4 schematically illustrates, in terms of a number of functional modules, the components of a CMU 2. A processing unit 10 is provided using any combination of one or more of a suitable central processing unit (CPU), multiprocessor, microcontroller, digital signal processor (DSP), application specific integrated circuit (ASIC) etc., capable of executing software instructions stored in a computer program product 18 (as in FIG. 6), e.g. in the form of a memory 13. Thus the processing unit 10 is thereby arranged to execute methods as herein disclosed. The memory 13 may also comprise persistent storage, which, for example, can be any single one or combination of magnetic memory, optical memory, solid state memory or even remotely mounted memory. The CMU 2 may further comprise an input/output (I/O) interface in the form of one or more transmitters 11 and receivers 12, comprising analogue and digital components. The processing unit 10 controls the general operation of the CMU 2, e.g. by sending control signals to the transmitter 11 and/or receiver 12 and receiving reports from the transmitter 11 and/or receiver 12 of its operation. Other components, as well as the related functionality, of the CMU 2 are omitted in order not to obscure the concepts presented herein.

Figure 5:
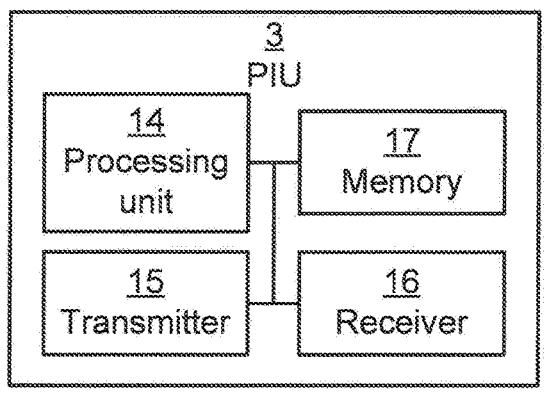
FIG. 5 schematically illustrates functional modules of a program interface unit.

FIG. 5 schematically illustrates, in terms of a number of functional modules, the components of a PIU 3. A processing unit 14 is provided using any combination of one or more of a suitable central processing unit (CPU), multiprocessor, microcontroller, digital signal processor (DSP), application specific integrated circuit (ASIC) etc., capable of executing software instructions stored in a computer program product 18 (as in FIG. 6), e.g. in the form of a memory 17. Thus the processing unit 14 is thereby arranged to execute methods as herein disclosed. The memory 17 may also comprise persistent storage, which, for example, can be any single one or combination of magnetic memory, optical memory, solid state memory or even remotely mounted memory. The PIU 3 may further comprise an input/output (I/O) interface in the form of one or more transmitters 15 and receivers 16, comprising analogue and digital components. The processing unit 14 controls the general operation of the PIU 3, e.g. by sending control signals to the transmitter 15 and/or receiver 16 and receiving reports from the transmitter 15 and/or receiver 16 of its operation. Other components, as well as the related functionality, of the PIU 3 are omitted in order not to obscure the concepts presented herein.

Figure 6:
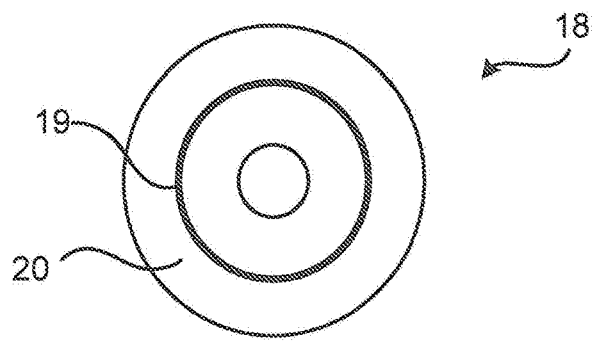
FIG. 6 schematically illustrates a computer program product.
Figure 9:
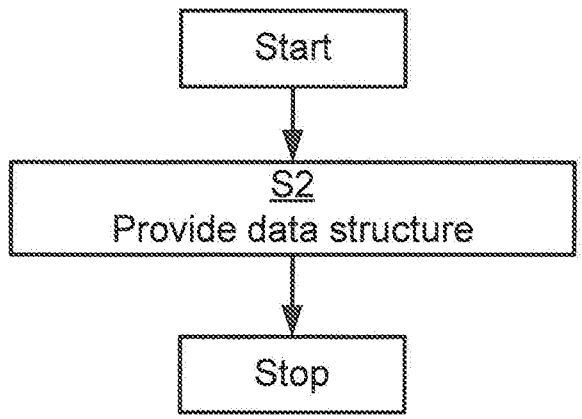
FIGS. 9-11 are flowcharts of methods according to embodiments.
Figure 11:
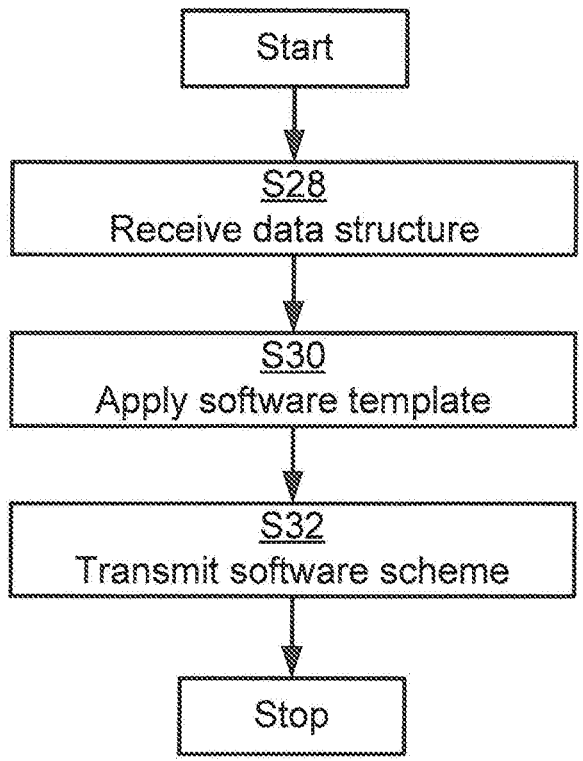
Figure 10:
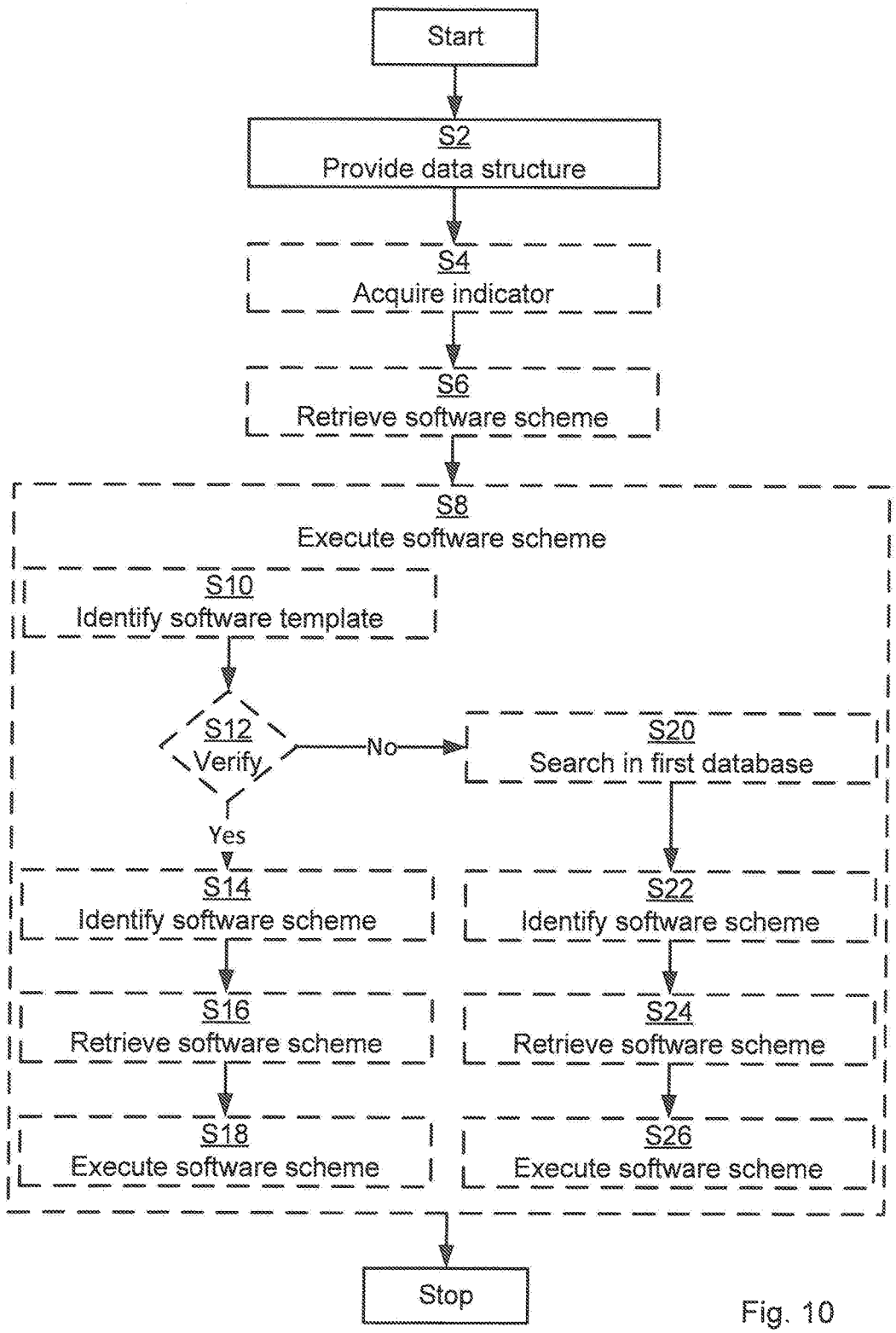

FIGS. 9, 10 and 11 are flow charts illustrating embodiments for re-configuration of an application 6a-n hosted and executable by a management unit 2 in a cloud computing environment 21. The methods according to the flowcharts of FIGS. 9 and 10 are performed in the CMU 2. The methods according to the flowchart of FIG. 11 are performed in the PIU 3. The methods are advantageously provided as computer programs 18 comprising a data structure 19 for use in a cloud computing environment 21. FIG. 6 shows one example of a computer program product 18 comprising computer readable means 20. On this computer readable means 20, a computer program 19 can be stored. The computer program 19 may in particular comprise the herein disclosed data structure. The computer program 19 may alternatively or additionally comprise instructions for causing the processing unit 10 and thereto operatively coupled entities and devices, and/or the processing unit 14 and thereto operatively coupled entities and devices to execute methods according to embodiments described herein.

In the example of FIG. 6, the computer program product 18 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 19 is here schematically shown as a track on the depicted optical disk, the computer program 19 can be stored in any way which is suitable for the computer program product 18.

The enclosed embodiments are based on enabling an alignment of complex re-configuration scenarios between the CMU 2 (that is arranged to detects if scaling up or down or another re-configuration process, such as a software upgrade, is needed for an application 6a-n hosted by the CMU 2) and software stacks hosted in the cloud computing environment 21. For example, the re-configuration may relate to upgrading existing software instructions of the hosted application. For example, the re-configuration may relate to scaling of the hosted application. The scaling may comprise adding or removing a clone of the hosted application in the cloud computing environment 21. The scaling may relate to increasing or decreasing a resource allocation associated with executing the hosted application 6a-n by the CMU 2. The resource allocation may comprise reserving additional or fewer network resources than current network resources for executing the hosted application 6a-n by the CMU 2. Additionally or alternatively the network resources may relate to a bandwidth associated with the hosted application 6a-n in the cloud computing environment 21. Additionally or alternatively the network resources may relate to a memory allocation associated with the hosted application 6a-n in the cloud computing environment 21.

The re-configuration is performed by the CMU 2 executing a software scheme. FIG. 3 schematically illustrates modules 9a, 9b, 9c, of a software scheme 9. Each software scheme 9 may in detail describe fine grained intermediate steps (where each step is represented by a module 9a-c) to be taken in order to reach a target re-configuration for a particular hosted application. Thus, the software schemes 9 may be regarded as pre-defined sets of atomic actions.

The software schemes 9 originate from software templates that allow an application provider via a PIU 3 to add change artifacts to the single steps in the re-configuration process defined by the software template. In more detail, the software template describes a flow of actions executable by the CMU 2 for re-configuration of an application 6a, 6b, 6n hosted by the management unit 2 and executable by the management unit 2 using the software scheme 9. For example, there may be atomic software upgrade actions that are related to software upgrade artifacts. For example, there may be atomic scaling actions that are related to scaling artifacts. For example, there may be atomic resource allocation actions that are related to resource allocation artifacts, etc. An application blueprint that offers support of a certain software scheme may, according to embodiments, provide artifacts for all related actions. For scaling this can for example be a script that moves parts of the user accounts to a new installation on a new application node (as in FIG. 1, parts of an application App A may be distributed between two installations App A-1 and App A-2) in order to have some user devices served by the "old" node running, say, App A-1, and some by the "new" node running, say, App A-2. These scripts practically apply the re-configuration action to the application by means of the associated software scheme. Each data structure may comprises one or more such software templates. FIG. 2 schematically illustrates modules 8a, 8b, 8c, of a software template 8. In more detail, the software template 8 comprises software instructions comprising a first portion (such as illustrated by the first module 8a) of software instructions which is non-editable by a PIU 3 of the hosted application. The first portion of the software instructions may relate to pre-determined actions to be performed by the CMU 2.

According to embodiments the application developer, by means of the PIU 3, is only enabled to add additional actions, but not change actions that are originally disclosed in the software template. For example, the application developer, as defined by the PIU 3, is according to embodiments not allowed to change any of the cloud management related steps, but it is allowed to add additional actions for addressing the application's management accordingly. The software template therefore allows for a second portion (such as illustrated by the second module 8b) of software instructions to be added to the software template by the PIU 3 of the hosted application 6a, 6b, 6n. The second portion of software instructions may relate to application programming interface, API, calls. The additional application specific actions may thus according to embodiments only call application APIs and not trigger additional actions in the cloud manager's 2 domain as this would change the workflow of the software template. The API calls may relate to spreading of data over a number of nodes. For example, when data needs to be spread over an additional node, the additional node may transmit an acknowledge message to confirm that it is ready to receive data. A corresponding API call may therefore inform the application thereof and so that the application may move parts of its data to the additional node. Upon completion thereof the application acknowledges and the CMU 2 proceeds. In a later phase another API call might trigger the application to perform a re-configuration of the load balancer.

The software instructions may further comprise a third portion (such as illustrated by the third module 8c) which, to at least some extent, may be regarded as editable by the PIU 3 of the hosted application 6a-n. The third portion of software instructions may relate to alternatives provided in the software template 9. For example, the software template 9 may allow for either a first set of instructions to be executed or a second set of instructions to be executed. The third portion of software instructions may determine which of the first set of instructions and the second set of instructions that is to be executed. Thus, although the PIU 3 may not alter the instructions as such, this may allow for a flexible software template to be provided.

In addition to the actual steps/actions/instructions defined in the software template to be performed by the CMU 2 during execution of the re-configuration, the PIU 3 is thus enabled to add further steps/actions/instructions to the software template 8. This creates the software scheme 9, which therefore is application dependent. The software template 8 thus describes the flow of actions executed by the CMU 2 in order to re-configure a particular hosted application 6a-n. For example, the software template 8 may describe intermediate API steps for adding and/or removing resources to/from a hosted application 6a-n. Each of the steps may contain a brief description of what operations that are performed by the step. The semantics of these steps/descriptions are typically documented and could even be standardized.

The software scheme may be dynamically changed in order to reflect the current state of the application associated with the software scheme. This may be useful if the application enters a state where different re-configuration operations may be applicable. Hence the data structure may enable a dynamic change of the software scheme as generated by the PIU 3 from the software template 9.

The data structure may enables branching and/or conditional execution of the software scheme 8 as generated by the PIU 3 from the software template.

The software scheme may not only contain actions, it may also comprise variables and parameters. For example, a set of variables or parameters may be defined for the software template 9. The software instructions may thus comprise variables and parameters. The variables and parameters may relate to identification of the hosted application. For example, the identification may be provided as an internet protocol (IP) address of a new node may be required for scaling up to actually move data to the new node. The CMU 2 and the hosted application may write such variables and parameters in order to, e.g. parameterize the calls of scaling scripts or scaling related function calls. The variables and parameters may also be used in order to communicate state and errors, thus integrating a rudimentary error handling.

If for example an error occurs during the re-configuration it might be necessary to for the application being re-configured return to a configuration (as defined by a state) before the re-configuration process was started. For this purpose it may be possible to accompany the re-configuration actions with respective rollback actions. Thus, the software template may further comprise software instructions for re-configuration of the application back to a state before the software scheme as generated by the PIU 3 from the software template has been applied by the CMU 2 to the hosted application 6a-n.

From the PIU's 3 point of view the software template 8 clearly describes how a re-configuration activity will be executed by the CMU 2 so that the PIU 3 can generically adapt to it by providing respective artifacts like scripts or by assigning API calls to be used at a particular stage, thus forming a software scheme 9 from the software template 8.

From the CMU's 2 point of view, the hosted application 6a-n has expressed its general support for a specific process of re-configuration. This specific process of re-configuration is determined by the specific software template used by the PIU 3 when generating the software scheme. The CMU 2 is thereby enabled to perform re-configuration of a hosted application in all the ways the hosted application supports by the provided software scheme. The CMU 2 may also be enabled to coordinate the changes in the infrastructure of the cloud computing environment 21 by executing the artifacts provided by the hosted application 6a-n in its software scheme.

The software scheme and the software template thereby allow a separation of concerns. Instead of integrating the hosted application 6a-n tightly with the CMU 2, the application 6a-n is integrated with one or more software scheme (by means of one or more software templates). Thus every CMU 2 supports and is able to execute software schemes based on software templates provided by the CMU and is therefore enabled to automatically perform coordinated (in the sense of interaction between the CMU 2 and the hosted application 6*a-n*) re-configuration of this application. Thus the software schemes may be regarded as constituting a generic scalability API between the CMU 2 and the applications 6*a-n*.

The software templates may be implemented in a workflow language like BPEL (business process execution language) or BPMN (business process model and notation). Business Process Execution Language is short for Web Services Business Process Execution Language (WS-BPEL) and is an OASIS (Organization for the Advancement of Structured Information Standards) standard executable language for specifying actions within business processes with web services. Processes in BPEL export and import information by using web service interfaces exclusively.

Figure 7:
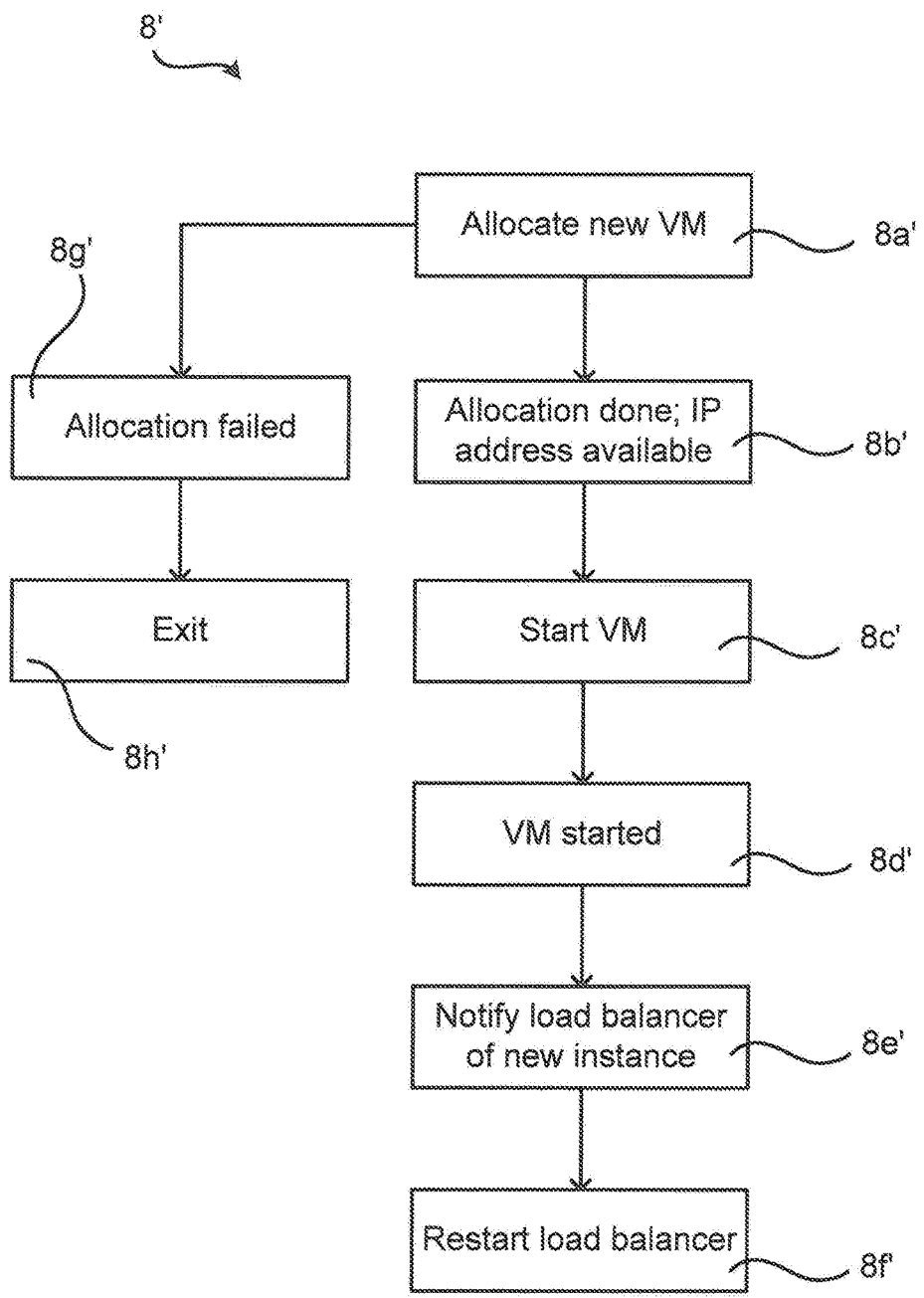
FIG. 7 schematically illustrates a graphic representation of a software template.

FIG. 7 schematically illustrates a graphic representation of a software template 8' being a realization of the software template 8 of FIG. 2. The software template 8' contains action modules 8*a'*, 8*b'*, 8*c'*, 8*d'*, 8*e'*, 8*f'*, 8*g'*, and 8*h'*, defined by the CMU 2 in so as to execute the re-configuration. Each software template 8' may be published under a unique ID. In more detail, in a step S2 a data structure 19 is provided to the first database 4. The data structure 19 is provided by the transmitter 11 of the CMU 2. Thereby the software template may be regarded as published by the CMU 2.

Figure 8:
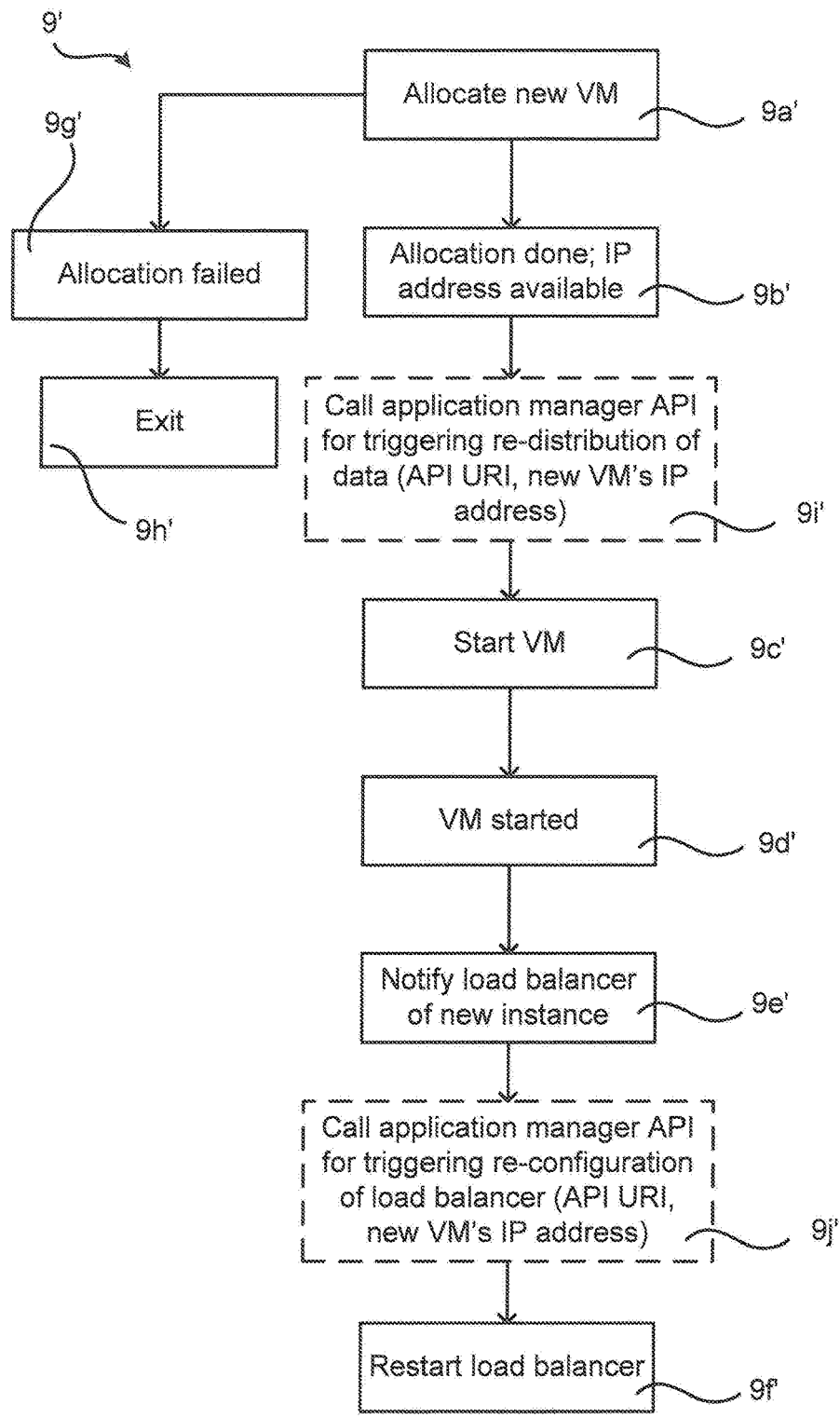
FIG. 8 schematically illustrates a graphic representation of a software scheme.

According to the example of FIG. 8 a software template 8' may comprise an action module 8*a'* relating to a new virtual machine (VM) to be allocated, an action module 8*b'* relating to allocation performed and an IP address of the new VM being available, an action module 8*c'* relating to start of the VM, an action module 8*d'* relating to the VM having been started, an action module 8*e'* relating to a load balancer being notified of the new instance of the application (e.g., that a new VM has been started and the IP address of the new VM), an action module 8*f'* relating to restart of the load balancer, an action module 8*g'* relating to allocation of the new VM having failed, and an action module 8*h'* relating to exit from the template as a result of the new VM having failed.

An application developer, as defined by the PIU 3, of an application that is running in the cloud computing environment 21 is thereby able to, by traversing the first database 4 comprising the published software templates 8, 8', acquire information relating to what steps the CMU 2 may execute if a particular application 6*a-n* hosted in the cloud computing environment 21 is to be re-configured. The application developer, as defined by the PIU 3, may then acquire one or more templates from the first database 4 and generate for each acquired software template generate a software scheme by editing and/or adding application specific details to the software template. In more detail, in a step S28 the data structure 19 is retrieved from the first database 4. The data structure 19 is retrieved by the receiver 16 of the PIU 3. The software template of the data structure is then in a step S30 applied to an application 6*a*, 6*b*, 6*n*. The software template is applied by the processing unit 14 of the PIU 3. In step S30 the second portion (8*b*) of software instructions is added. A software scheme 9 is thereby generated by the processing unit 14 of the PIU 3.

FIG. 8 schematically illustrates a graphic representation of a software scheme 9' being a realization of the software scheme 9 of FIG. 3. The software scheme 9' has been generated from the software template 8' of FIG. 7. The software scheme 9' contains action modules 9*a'*, 9*b'*, 9*c'*, 9*d'*, 9*e'*, 9*f*, 9*g'*, 9*h'*, 9*i'*, and 9*j'* defined by the CMU 2, edited, and/or added by the PIU 3. In the example of FIG. 8 the action modules 9*a'*, 9*b'*, 9*c'*, 9*d'*, 9*e'*, 9*f*, 9*g'*, and 9*h'* of the software scheme 9' correspond to the action modules 8*a'*, 8*b'*, 8*c'*, 8*d'*, 8*e'*, 8*f'*, 8*g'*, and 8*h'*, respectively, of the template 8'. Action modules 9*i'* and 9*j'* have been added by the PIU 3 during its generation of the software scheme 9'. For example, in the action module 9*i'* an API calls to the application for triggering re-distribution of data. Here the application is for example a database that needs to redistribute the data over a new number of nodes available (such as redistributing the data from App A-1 to App A-1 and app A-2 in FIG. 1). For example, the CMU 2 will generate a new VM with a new installation of the database, but loading some of the data into the new database is something the database manager itself needs to perform. Also the load balancer needs to be reconfigured in order to send traffic to the new instance, as in the action module 9*j'* relating to an API call for triggering re-configuration of the load balancer.

By means of the second database 5 the completed software scheme is then provided to the cloud computing environment 21 when loading the application 6*a-n*. It may be conditioned that a software scheme has been provided to the second database 5 before the CMU 2 loads the application (i.e., before the application is hosted by the CMU 2). In a step S32 the software scheme is transmitted to a second database 5. The software scheme is transmitted by the transmitter 15 of the PIU 3.

When deploying the application in the cloud computing environment 21 also all software schemes supported by the application are registered in the second database 5. When the CMU 2 sets up the infrastructure and deploys this application, correlation information between the ID of the deployment and the application's software scheme(s) is added to the CMU 2. The second database 5 may thus store software schemes from applications together with the ID of the cloud deployment they belong to. This cloud deployment is managed by the CMU 2. By means of the second database 5 the CMU 2 is enabled to acquire information regarding which software schemes are valid for a certain deployment.

During operation of the applications 6*a-n* in the cloud computing environment 21 the CMU 2 monitors the infrastructure of the cloud computing environment 21 in order to detect performance bottlenecks, overload situations and/or other performance degradations. The CMU 2 may also identify resources, such as virtual machines, that are idle in persistent low load situations. This may trigger re-configuration of one or more of the hosted applications 6*a-n*. In a step S4 an indicator of re-configuration of the hosted application is acquired. The indicator may relate to at least one of upgrading existing software instructions of the hosted application, scaling of the hosted application, resource allocation, etc. The indicator is acquired by the processing unit 10 of the CMU 2. The CMU 2 is thereby arranged to determine what actions to perform and how to perform the actions for a given identified situation. This corresponds to selecting a software template 8. In more detail, in a step S6 a software scheme 9 is retrieved from the second database 5. The software scheme 9 is retrieved by the transmitter 11 of the CMU 2. As noted above, the software scheme 9 has been generated by the PIU 3 applying the software template 8 of the data structure to an application 6*a-n* at least by adding the second portion 8*b* of software instructions (and optionally also editing a third portion 8*c* of software instructions). In a step S8 the software scheme 9 is executed. The software scheme is executed by the processing unit 10 of the CMU 2 performing the actions defined by the instructions of the software scheme 9.

As noted above, there may be one or more software templates 8 associated with a particular re-configuration of the cloud computing environment 21. Hence, the software template 8 selected by the CMU 2 may not be supported by the application 6*a-n* to be re-configured (i.e. there is no corresponding software scheme 9 for the particular application to be re-configured stored in the second database 5). The CMU 2 may therefore traverse the second database 5 in order to check if the application deployed in the effected nodes supports the preferred software template 8. If a match is found the corresponding software scheme 9 may be executed. In more detail, in a step S10 one software template from a plurality of software templates for re-configuration of one application of the plurality of applications is identified. The identification is performed by the processing unit 10 of the CMU 2. The processing unit 10 of the CMU 2 may then perform a number of verification operations. In a step S12 it is verified whether or not the one application complies with the one software template. If the one application complies with said the software template: a software scheme corresponding to the one software template is identified, step S14, the software scheme is retrieved, step S16, from the second database 5; and the software scheme is executed, step S18.

That is, if the preferred re-configuration procedure (as defined by the preferred software template) is found to be supported by the application, the CMU 2 executes the re-configuration by following the workflow of the corresponding software scheme. This means that the CMU 2 executes changes in the computing environment 21 and triggers application defined scripts and functions according to the workflow of the software scheme.

If a match is not found then the CMU 2 may select another software template and may repeat traversing the second database 5 in order to check if the application deployed in the effected nodes supports said another software template. In more detail, in a step S20 the first database may be searched for a different software template. The one application is compliant with the different software template. A different software scheme corresponding to the different software template is identified, step S22. The different software scheme is retrieved, step S24, from the second database. The different software scheme is then executed, step S26.

Hence, the CMU 2 is arranged to determine a re-configuration method for which a software scheme of the affected application is available when re-configuration is needed. The CMU 2 may then perform all steps defined in the software template by executing a corresponding software scheme. The software scheme thus includes any additional action modules added by the application developer, as defined by the PIU 4. If the CMU 2 encounters such an additional action module in the software scheme, the CMU 2 calls the respective application API and waits for a response before continuing the execution of the software scheme.

Finally, if the execution of the software scheme is finished successfully the re-configuration process has ended.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computer program product comprising a non-transitory computer readable medium storing a data structure for use in a cloud computing environment, the data structure comprising:

a software template describing a flow of actions executable by a cloud management unit in the cloud computing environment for re-configuration of an application hosted by the cloud management unit and executable by the cloud management unit using a first software scheme, wherein the re-configuration relates to scaling of the hosted application and upgrading software instructions of the hosted application, wherein the first software scheme originates from the software template that allows adding, via a programming interface unit of the hosted application, additional actions to the flow of actions, without changing the existing actions in the re-configuration defined by the software template, wherein the data structure enables a dynamic change of the first software scheme as generated by the programming interface unit of the hosted application from the software template, wherein the software template comprises the software instructions, and wherein the software instructions comprise:

a first portion of the software instructions non-editable by the programming interface unit of the hosted application;

a second portion of the software instructions allowed by the software template to be added to the software template by the programming interface unit of the hosted application, wherein the second portion of the software instructions is added to the software template, by the programming interface unit of the hosted application, to apply the software template of the data structure to the hosted application, and wherein the software template of the data structure is applied to the hosted application to generate a second software scheme; and a third portion of the software instructions editable by the programming interface unit of the hosted application, wherein the third portion determines which of the first portion or the second portion of the software instructions needs to be executed by the programming interface unit of the hosted application.

2. The computer program product of claim 1, wherein the scaling relates to increasing or decreasing a resource allocation associated with executing the hosted application by the cloud management unit.

3. The computer program product of claim 2, wherein the resource allocation comprises reserving additional or fewer network resources than current network resources for executing the hosted application by the cloud management unit.

4. The computer program product of claim 3, wherein the network resources relate to a bandwidth associated with the hosted application in the cloud computing environment.

5. The computer program product of claim 3, wherein the network resources relate to a memory allocation associated with the hosted application in the cloud computing environment.

6. The computer program product of claim 1, wherein the scaling comprises adding or removing a clone of the hosted application in the cloud computing environment.

7. The computer program product of claim 1, wherein the hosted application is one of: a database service, a webserver service, a web service, and a software application.

8. The computer program product of claim 1, wherein the first portion of the software instructions relates to pre-determined actions to be performed by the cloud management unit.

9. The computer program product of claim 1, wherein the second portion of the software instructions comprises Application Programming Interface (API) calls.

10. The computer program product of claim 1, wherein the data structure enables branching and conditional execution of the first software scheme as generated by the programming interface unit of the hosted application from the software template.

11. The computer program product of claim 1, wherein the software instructions further comprise variables and parameters relating to identification of the hosted application.

12. The computer program product of claim 1, wherein the software template further comprises software instructions for re-configuration of the hosted application back to a state before the first software scheme as generated by the programming interface unit of the hosted application from the software template that has been applied by the cloud management unit to the hosted application.

13. A method for re-configuration of an application hosted and executable by a cloud management unit in a cloud computing environment, the method being performed by the cloud management unit, the method comprising:
  providing a data structure to a first database, the data structure comprising:
    a software template describing a flow of actions executable by the cloud management unit in the cloud computing environment for the re-configuration of the application hosted by the cloud management unit and executable by the cloud management unit using a first software scheme, wherein the first software scheme originates from the software template that allows adding, via a programming interface unit of the hosted application, additional actions to the flow of actions, without changing the existing actions in the re-configuration defined by the software template, wherein the data structure enables a dynamic change of the first software scheme as generated by the programming interface unit of the hosted application from the software template,
  wherein the software template comprises software instructions, and wherein the software instructions comprise:
    a first portion of the software instructions non-editable by the programming interface unit of the hosted application;
    a second portion of the software instructions allowed by the software template to be added to the software template by the programming interface unit of the hosted application; and
    a third portion of the software instructions editable by the programming interface unit of the hosted application, wherein the third portion determines which of the first portion or the second portion of the software instructions needs to be executed by the programming interface unit of the hosted application;
  acquiring an indicator of the re-configuration of the hosted application, wherein the indicator relates to at least one of upgrading the software instructions of the hosted application and scaling of the hosted application;
  retrieving a second software scheme from a second database, wherein the second software scheme is generated, by the programming interface unit of the hosted application, by applying the software template of the data structure to the hosted application, and wherein the applying the software template of the data structure to the hosted application is performed by adding the second portion of the software instructions to the software template; and
  executing the second software scheme.

14. The method according to claim 13, wherein the software template is one of a plurality of software templates stored in the first database, and wherein the hosted application is one of a plurality of applications hosted and executable by the cloud management unit, the method further comprising:
  identifying one software template from the plurality of software templates for re-configuration of said one application of said plurality of applications;
  verifying whether or not said one application complies with said one software template; and if said one application complies with said one software template:
    identifying a third software scheme corresponding to said one software template;
    retrieving said third software scheme from the second database; and
    executing said third software scheme.

15. The method according to claim 14, wherein, if said one application does not comply with said one software template, the method further comprising:
  searching in said first database for a different software template, said one application being compliant with said different software template;
  identifying a different software scheme corresponding to said different software template;
  retrieving said different software scheme from the second database; and
  executing said different software scheme.

16. A method for re-configuration of an application hosted and executable by a cloud management unit in a cloud computing environment, the method being performed by a programming interface unit of the application, the method comprising:
  retrieving a data structure from a first database, wherein the data structure comprising: a software template describing a flow of actions executable by the cloud management unit in the cloud computing environment for the re-configuration of the application hosted by the cloud management unit and executable by the cloud management unit using a software scheme, wherein the re-configuration relates to scaling of the hosted application and upgrading software instructions of the hosted application, wherein the software scheme originates from the software template that allows adding, via the programming interface unit of the hosted application, additional actions to the flow of actions, without changing the existing actions in the re-configuration defined by the software template, wherein the data structure enables a dynamic change of the software scheme as generated by the programming interface unit of the hosted application from the software template, wherein the software template comprises the software instructions, and wherein the software instructions comprise: a first portion of the software instructions non-editable by the programming interface unit of the hosted application, a second portion of the software instructions allowed by the software template to be added to the software template by the programming interface unit of the hosted application, and a third portion of the software instructions editable by the programming interface unit of the hosted application, and wherein the third portion determines which of the first portion or the second portion of the software instructions needs to be executed by the programming interface unit of the hosted application;

applying the software template of the data structure to the hosted application by adding the second portion of the software instructions to the software template, thereby generating the software scheme; and transmitting the software scheme to a second database.

17. A cloud management unit for re-configuration of an application hosted and executable by a processor of the cloud management unit in a cloud computing environment, the cloud management unit comprising:

a transmitter arranged to provide a data structure according to a first database, the data structure comprising:

a software template describing a flow of actions executable by the processor of the cloud management unit in the cloud computing environment for the re-configuration of the application hosted by the cloud management unit and executable by the processor of the cloud management unit using a first software scheme, wherein the re-configuration relates to scaling of the hosted application and upgrading software instructions of the hosted application, wherein the first software scheme originates from the software template that allows adding, via a programming interface unit of the hosted application, additional actions to the flow of actions, without changing the existing actions in the re-configuration defined by the software template, wherein the data structure enables a dynamic change of the first software scheme as generated by the programming interface unit of the hosted application from the software template, wherein the software template comprises the software instructions, and wherein the software instructions comprise:

a first portion of the software instructions non-editable by the programming interface unit of the hosted application;

a second portion of the software instructions allowed by the software template to be added to the software template by the programming interface unit of the hosted application; and a third portion of the software instructions editable by the programming interface unit of the hosted application, wherein the third portion determines which of the first portion or the second portion of the software instructions needs to be executed by the programming interface unit of the hosted application;

the processor arranged to acquire an indicator of the re-configuration of the hosted application; and a receiver arranged to retrieve a second software scheme from a second database, wherein the second software scheme is generated, by the programming interface unit of the hosted application, by applying the software template of the data structure to the hosted application, and wherein the software template of the data structure is applied to the hosted application by adding the second portion of the software instructions to the software template; and wherein the processor is further arranged to execute the second software scheme.

18. A programming interface unit for re-configuration of an application hosted and executable by a processor of a cloud management unit in a cloud computing environment, the programming interface unit comprising:

a receiver arranged to retrieve a data structure from a first database, the data structure comprising: a software template describing a flow of actions executable by the processor of the cloud management unit in the cloud computing environment for the re-configuration of the application hosted by the cloud management unit and executable by the processor of the cloud management unit using a software scheme, wherein the re-configuration relates to scaling of the hosted application and upgrading software instructions of the hosted application, wherein the software scheme originates from the software template that allows adding, via the programming interface unit of the hosted application, additional actions to the flow of actions, without changing the existing actions in the re-configuration defined by the software template, wherein the data structure enables a dynamic change of the software scheme as generated by the programming interface unit of the hosted application from the software template, wherein the software template comprises the software instructions, and wherein the software instructions comprise:

a first portion of the software instructions non-editable by the programming interface unit of the hosted application, a second portion of the software instructions allowed by the software template to be added to the software template by the programming interface unit of the hosted application, and a third portion of the software instructions editable by the programming interface unit of the hosted application, wherein the third portion determines which of the first portion or the second portion of the software instructions needs to be executed by the programming interface unit of the hosted application;

a processor further arranged to apply the software template of the data structure to the hosted application by adding the second portion of the software instructions to the software template, thereby generating the software scheme; and a transmitter arranged to transmit the software scheme to a second database.

* * * * *